Nov. 16, 1954  E. J. BAIREUTHER ET AL  2,694,339
ILLUMINATED STEREOSCOPIC VIEWER
Filed Oct. 9, 1950  3 Sheets-Sheet 1
Fig. 1
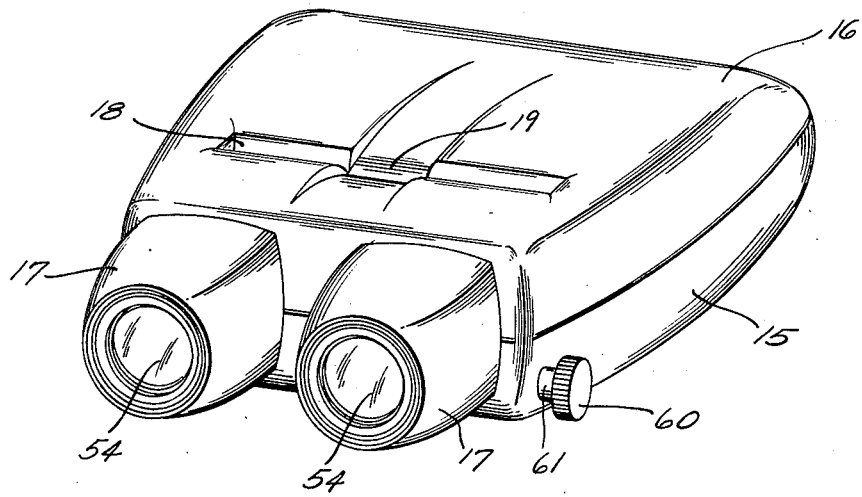
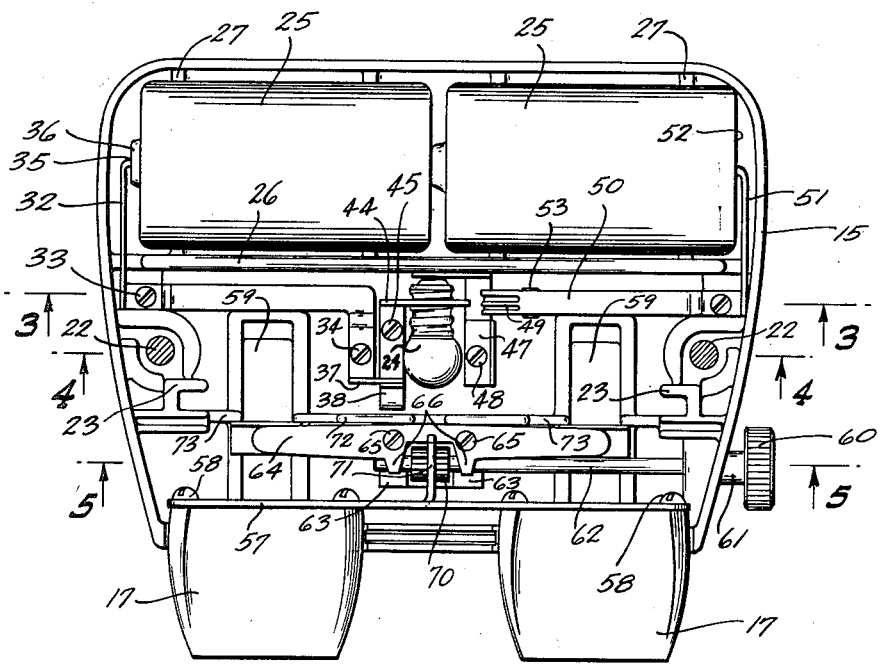
Fig. 2
INVENTORS
Seton I. Rochwite
Edward J. Baireuther
BY James M. Condran.
Attorney

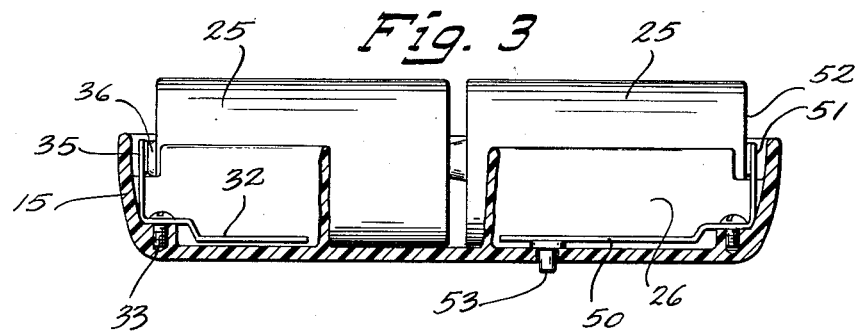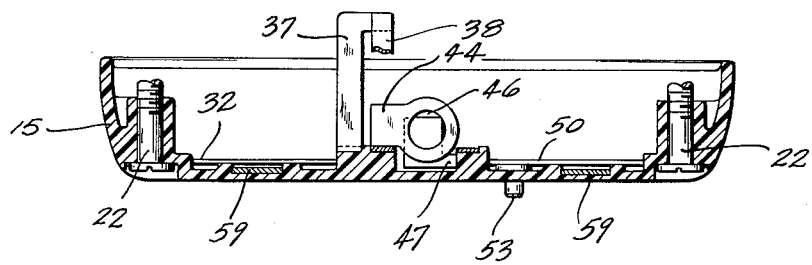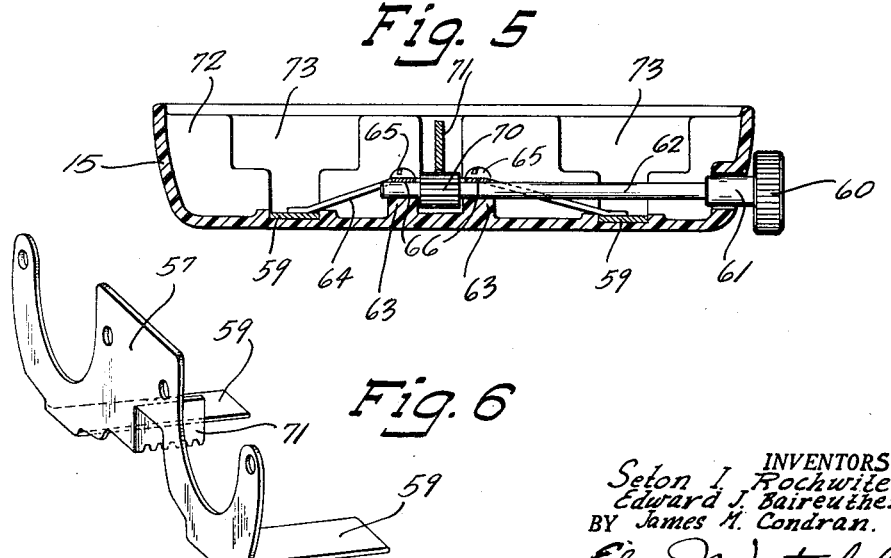

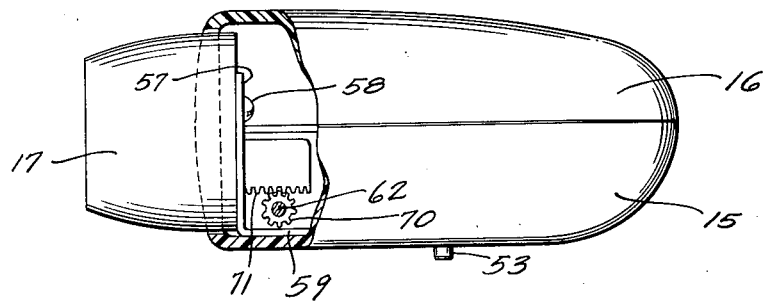
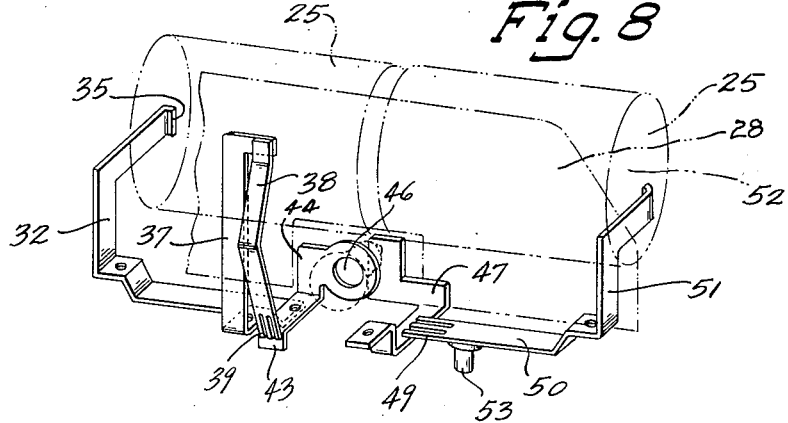
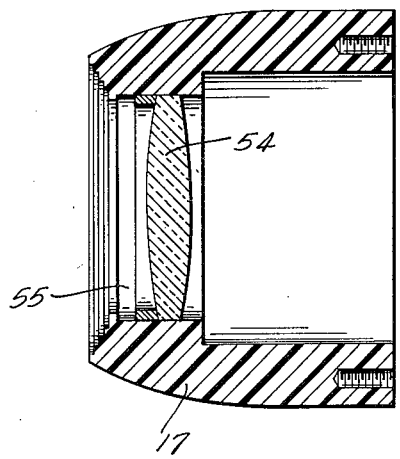
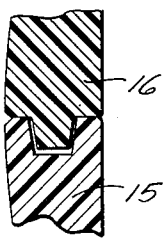
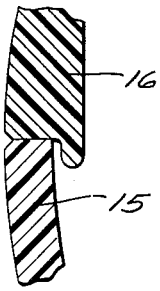

United States Patent Office 2,694,339
Patented Nov. 16, 1954

2,694,339

ILLUMINATED STEREOSCOPIC VIEWER

Edward J. Baireuther and James M. Condran, Milwaukee, Wis., and Seton I. Rochwite, Los Alamos, N. Mex.

Application October 9, 1950, Serial No. 189,277

4 Claims. (Cl. 88—29)

This invention relates generally to stereoscopes and more particularly to an improved instrument for viewing transparent stereographs commonly referred to as slides.

A general object of the invention is to provide a stereoscope which will facilitate the viewing of stereographs.

Another object of the invention is to provide an improved illuminating system for use in a stereoscope.

Another object of the invention is to provide an improved stereoscope having an automatic electrical system for illuminating the stereograph.

A further object of the invention is to provide an illuminating system for a stereoscope which will be actuaetd automatically upon insertion of the stereograph in its viewing position, but will be rendered inoperative when the stereoscope is not in use even though the stereograph is not removed.

A still further object is to provide an improved stereoscope of simple and inexpensive construction.

According to this invention a stereoscope of sturdy but simple and inexpensive construction is equipped with an improved electrical system for illuminating the stereograph or slide. The instrument is arranged to be used in conjunction with the type of slide mounting two transparent films containing the image to be viewed in ocularly spaced relationship. The electrical circuit transmitting energy to the illuminating lamp includes two switches, both of which must be closed to complete the circuit. One of the switches is normally open and the other is normally closed. The normally open switch is arranged to be actuated by the insertion of a slide into the stereoscope; this effects closure of the switch to complete the circuit and energize the lamp. Illumination is thereby provided for observing the picture, which will appear in three dimensions, due to the fact that the two images contained on the slide in ocularly spaced relationship are being viewed, one with the left eye and the other with the right eye. The normally closed switch functions as a safety switch to break the circuit when the stereoscope is not in use even though the slide has not been removed from its viewing position. This is accomplished by a button connected to the switch and spring urged to extend beyond the bottom of the stereoscope. When the instrument is set down its weight overcomes the pressure of the spring to force the button into the stereoscope case and cause the switch to open, thereby breaking the electrical circuit conducting current to the lamp.

The foregoing and other objects of the invention which will become more fully apparent from the following detailed description, may be achieved through embodiment of the invention in an apparatus such as the exemplifying device depicted in and herein described in connection with the accompanying drawings, in which:

Figure 1 is a perspective view of a stereoscope constructed in accordance with the teachings of the present invention;

Figure 2 is a detail plan view of the instrument depicted in Fig. 1, with the cover removed to show the interior mechanism;

Figure 3 is a view partly in elevation and partly in vertical section, taken along the plane represented by the line 3—3 in Fig. 2, illustrating the battery mounting;

Figure 4 is a view substantially in vertical section taken along the plane represented by the line 4—4 in Fig. 2;

Figure 5 is a view partly in elevation and partly in vertical section, taken along the plane represented by the line 5—5 in Fig. 2, depicting the eye piece focusing mechanism;

Figure 6 is a detail view in perspective of the eye piece mounting bracket;

Figure 7 is a view in side elevation of the instrument shown in Fig. 1, with part of the case broken away to show the focusing drive mechanism;

Figure 8 is a detailed perspective view of the electrical system with all other parts of the instrument omitted and showing two dry cells in phantom as the source of electrical energy;

Figure 9 is a view in horizontal section illustrating the interior construction of the eye pieces;

Figure 10 is a view in vertical section showing the construction of the juncture of the case and its cover between the eye pieces; and Figure 11 is a detail view in vertical section illustrating the construction of the joint joining the case and its cover at all points other than the portion between the eye pieces.

Referring to the drawings and more specifically to Fig. 1 thereof, the instrument there shown is comprised of a case 15 and a mating cover 16 which serves to form a sealed enclosure when assembled. The case 15 and the cover 16 have corresponding front openings which register when the two parts are assembled to form two apertures for receiving a pair of eye pieces 17 through which the picture is viewed. The stereoscopic slide (not shown) containing the picture to be viewed is inserted in a slot 18 formed in the cover 16. To facilitate the grasping of the slide with the fingers while it is fully contained within the instrument, the cover 16 has a depression 19 extending transversely across the center of the slot 18.

The cover 16 is retained in position on the case 15 by a pair of screws 22, shown in Fig. 4, which extend through holes provided in the case 15 to engage cooperating threaded holes (not shown) formed in the cover 16. As the slide is inserted into the slot 18 it drops between a pair of U-shaped retainers 23 formed integrally with the case 15. The retainers serve to retain the slide in viewing position within the instrument.

Light for illuminating the slide is obtained from a single electric lamp 24 centrally located within the case 15 in back of the slide. The light from the lamp 24 is diffused by a curved reflective surface strip 28 (shown in Fig. 8) which is securely retained by the cover 16. The reflective surface functions to distribute the light equally over the entire slide. In the illustrated embodiment, electrical energy for energizing the lamp 24 is obtained from a pair of batteries 25 although it is to be understood that other sources of electricity may be utilized without departing from the scope of the present invention.

The batteries 25 are contained within a battery compartment in the case 15, with the compartment being formed by the back of the case and a vertical partition 26 extending across its width. A plurality of transverse ribs 27 are disposed in spaced relationship at the bottom of the battery compartment. These ribs present a concave circular edge conforming to the periphery of the batteries; the ribs serve to firmly support the batteries. Similarly shaped ribs (not shown) are provided in the cover 16 to cooperate with the ribs 27 in the case and serve to tightly clamp the batteries within the compartment.

The electrical circuit, as clearly shown in Fig. 8, is comprised of parts stamped of an electrical conducting metal and welded together where necessary to constitute sturdy but simple and inexpensive construction. A conductor 32 is secured to the bottom of the case 15 by suitable screws 33 and 34. The conductor is fabricated of a resilient material which serves to urge its contacting edge 35 into engagement with one contact terminal 36 of the batteries 25. There is secured to the other end of the conductor 32 a current carrying bracket 37 extending upwardly of the conductor 32. The bracket 37 has a horizontal projection at its upper end from which depends a switch member 38.

The switch member 38 serves to close the circuit to the lamp 24 upon insertion of the slide in the slot 18. The switch member is secured at its upper end to the horizontal projection of the bracket 37 and is provided with three fingers 39 at the other end to provide an efficient electrical contact. The switch member is formed of a springular conductive material and bent at its center, causing its central portion to normally extend outwardly of the bracket 37 into the path of the slide as it is inserted in the instrument. In the normally open position of the switch, the fingers 39 are free of any contact.

Initial insertion of the slide effects a striking engagement with the member 38 above the bend; thereafter it is forced inwardly, causing the fingers 39 to contact a surface 43 of a lamp carrying bracket 44 which is secured to the case 15 by a screw 45. The bracket 44 has a hole 46 which is shaped to conform to the pitch of the thread on the base of the lamp 24 so that the lamp may be threadedly retained therein. When the slide is removed from the instrument, the member 38 springs back to its normally open position wherein the fingers 39 are out of contact with the surface 43 to interrupt the circuit to the lamp.

The lamp 24 is threaded into the hole 46 until the bottom contact thereof engages a conductor 47 which is attached to the case 15 by a screw 48. The conductor 47 is normally in communication with three fingers 49 formed on a spring element 50 of a conductor 51, to constitute a normally closed switch; the other end of the conductor 51 being in engagement with a contact surface 52 of the batteries 25.

With the circuit closed, the flow of electric current originates from the power source represented by the batteries 25 via the contacting edge 35 into the conductor 32. From the conductor 32, the current flow continues via the bracket 37 through the switch member 38 to its associated fingers 39. From the fingers 39, the current flows to the surface 43 and into the bracket 44 to energize the lamp 24. The current returns to its source through the conductor 47, the fingers 49, the spring element 50 and the conductor 51.

An actuating button 53 is disposed on the underside of the spring element 50 in position to extend into an opening formed in the bottom of the case 15. The spring pressure of the element 50 is exerted downwardly to urge the fingers 49 into engagement with the conductor 47 and cause the button 53 to project, through the opening formed in the case 15, beyond the outer bottom surface. When the instrument is set down, the button 53 engages the surface upon which it is resting. The weight of the instrument forces the button upwardly into the case against the spring pressure of the element 50, and moves the fingers 49 out of communication with the conductor 47 to break the circuit.

This arrangement provides a safety feature whereby even though the slide is not removed from its viewing position within the case 15 when the sterescope is not in use, the electrical circuit will be broken to preclude an unnecessary withdrawal of current from the batteries 25. Thus, the electrical circuit may be broken by either removing the slide to release the member 38 to its normal open position, or by setting the instrument on its bottom surface to actuate the spring element 50 to an open contact position.

The eye pieces 17 are provided with suitable magnifying lenses 54, as shown in Fig. 9, for enlarging the image. In the illustrated embodiment, the lenses 54 are formed of plastic which is a relatively soft material subject to being scratched and marred. A plain glass shield 55 is therefore provided before the exposed surfaces of the lenses 54 to protect them from damage which would detract from the clarity of the picture. A focusing mechanism is provided in the forward portion of the instrument to adjust the position of the lenses 54 by moving the eye pieces 17 to effectively focus to the eyesight of the person using the viewer. The focusing mechanism includes a bracket 57 to which the eye pieces 17 are secured by suitable screws 58 as shown in Fig. 2. The bracket 57 is guided in its movement by a pair of slides 59 disposed to move within cooperating guideways formed in the bottom of the case 15, as illustrated in Figs. 2, 4 and 5.

The focusing adjustment is effected by manipulating a knob 60 located on the outside of the case 15. An extending hub 61 is journalled in an enlarged portion of the case 15 and is fixed to a shaft 62 which extends into the instrument. The end of the shaft 62 opposite the knob 60 rests in grooves provided in the top of two bosses 63, which are formed integrally with the bottom of the case 15. The grooves formed in the bosses 63 serve as a bearing for the shaft 62, with the shaft being retained therein by a retainer 64 which is secured to the bosses by suitable screws 65.

The retainer 64 serves the dual purpose of keeping the shaft 62 in the grooves of the bosses 63, as well as retaining the slides 59 within their cooperating guideways. It is fabricated of a spring material with its ends extending downwardly from the center into contact with the tops of the slides 59 to resiliently retain them in position at all times. The horizontal center portion of the retainer 64 is provided with transverse projections 66 spaced to conform to the position of the bosses 63. They extend beyond the grooves formed in the bosses and bear upon the shaft 62 to resiliently retain the same in position in the grooves.

The driving connection for effecting a focusing adjustment is obtained through a spur gear 70 in meshing engagement with a gear rack 71. The gear 70 is fixed to the shaft 62 and disposed on the shaft between the two bosses 63. The gear rack 71 is secured to the bracket 57 and extends normal to it to engage the gear 70. A convenient method of fabricating the gear rack 71 is illustrated in Fig. 6, wherein the teeth are shaped on the bottom edge of the bracket 57 between the position of the eye pieces 17. A strip of metal containing these teeth is then pressed out of the body of the bracket with one edge of the strip remaining attached to the bracket. This strip is then bent outwardly until it is disposed normal to the body of the bracket and parallel with the slides 59. Thus, as the knob 60 is revolved, the shaft 62 and its associated gear 70 revolve with it. The rotating movement of the gear 70 causes a linear movement of its cooperating gear rack 71 to effect the focusing adjustment.

The light from the lamp 24 is confined to the rear portion of the instrument by a vertical partition 72 extending across the width of the case 15. It is located in juxtaposition with the slide being viewed between the slide and the eye pieces 17. A similar partition (not shown) provided in the cover 16 is disposed to register with the partition 72 in the case 15 when the two parts are assembled. The partition 72 has two rectangular openings 73 spaced to conform to the spacing of the films in the slide. These openings register with like openings provided in the cooperating portion of the cover 16 to form two rectangular openings conforming to the size of the two films contained in the slide and in registration with these films when the slide is positioned in the instrument. Thus, light is prevented from reaching the forward portion of the instrument except through the films being viewed to increase the clarity of the picture.

It will be noted that the various parts contained within the case 15 are designed to permit their manufacture of metal stampings. This provides for a sturdy but very simple and inexpensive construction without detracting from the quality of the instrument.

From the foregoing detailed description of a practical working embodiment of the invention, it is apparent that there has been provided a useful and convenient stereoscope through which ocularly spaced pictures may be clearly viewed in three dimensions and having an improved electrical system for illuminating the image bearing stereograph.

Although but a single embodiment of the invention has been set forth in considerable detail to constitute a full disclosure, it is to be understood that persons skilled in the art may utilize the novel principles here taught in apparatus differing in construction from the particular device herein described without departing from the spirit and scope of the invention, as defined in the subjoined claims.

The principles of the invention having now been fully explained in connection with the foregoing description of embodying structure, we hereby claim as our invention:

1. In a stereoscope for viewing a stereograph producing a three dimensional effect, a case having a cover to form a sealed enclosure with two apertures and a slot through which the stereograph to be viewed may be inserted to place it in position, a pair of eye pieces disposed in said apertures and having magnifying lenses through which the stereograph is observed, focusing means arranged to move said magnifying lenses relative to the stereograph being viewed to conform to the eyesight of the viewer, an electric lamp mounted in said case in position to illuminate the stereograph in its viewing position, a source of electrical energy connected to deliver energy to said lamp, a normally open switch connected in the circuit carrying energy from said source to said lamp and arranged to be actuated by the stereograph when placed in the viewing position to complete the circuit and cause energization of said lamp, and a normally closed switch arranged to be actuated when the stereoscope is set down to open the circuit and interrupt the flow of energy from said source to said lamp, whereby said lamp will be deenergized when the stereoscope is not in use even though the stereograph remains in viewing position.

2. In a stereoscope for viewing a picture contained on a stereograph, a case having a cover to form a sealed enclosure with two apertures and a slot through which the stereograph to be viewed may be inserted to place it in position, a pair of eye pieces disposed in said apertures and having magnifying lenses through which the stereograph is observed, focusing means arranged to move said eye pieces and their associated magnifying lenses relative to the stereograph to conform to the eyesight of the viewer, a source of electrical energy, an electric lamp mounted in said case in position to illuminate the stereograph in viewing position, an electrical conductor connected to one contact of said lamp, a second conductor connected to the other contact of said lamp, an electric conducting spring arm connected to said source of electrical energy and disposed to be moved into contact with said first conductor by the stereograph as it is placed in viewing position but normally spring urged out of contact with said first conductor, a second electric conducting spring arm normally spring urged into contact with said second conductor and connected to said source of electrical energy, and a button fixed to said second spring arm and disposed to extend through an opening in the bottom of the stereoscope beyond its bottom surface so that when the stereoscope is set down its weight forces the button inwardly against the spring pressure of said second spring arm to move it out of contact with said second conductor and break the electrical circuit to said lamp causing it to be deenergized, whereby the placing of the stereograph in viewing position causes energization of said lamp but when the stereoscope is not in use and is set down, said lamp is deenergized even though the stereograph is not removed from its viewing position.

3. In a stereoscope for viewing the picture contained on a stereograph, a case having a cover to form a sealed enclosure with two apertures and a slot through which the stereograph may be inserted into viewing position, a pair of eye pieces disposed in said apertures and having magnifying lenses mounted therein through which the stereograph is observed, a bracket disposed within said case and secured to said eye pieces to support them, a pair of slides fixed to said bracket and disposed to slide in guideways formed in said case, a gear rack secured to said bracket, a shaft rotatably mounted in said shaft and having a portion extending through an opening in said case, a spur gear mounted on said shaft to rotate with it in position to mesh with said gear rack and permit adjustment of the position of said magnifying lenses by rotating said shaft, an electric lamp mounted in said case in position to illuminate the stereograph, a source of electrical energy connected to deliver energy to said lamp, a normally open switch connected in the circuit carrying energy from said source to said lamp and arranged to be actuated by the stereograph when placed in the viewing position to complete the circuit and cause energization of said lamp, and a normally closed switch arranged to be actuated when the stereoscope is set down to open the circuit and interrupt the flow of energy from said source to said lamp, whereby said lamp will be deenergized when the stereoscope is not in use even though the stereograph remains in viewing position.

4. In a stereoscopic viewer, a case, a cover to form a sealed enclosure in said case, a stereograph receiving recess in said case, a pair of eye piece members including lenses operably mounted in said case to permit stereograph viewing, a power source, an illuminating bulb positioned within said case to illuminate a stereograph contained in said recess, an electric circuit interconnecting said power source and said bulb, a normally open switch in said circuit disposed to be actuated upon insertion of a stereograph in said recess to energize said bulb and permit viewing, and a normally closed switch mounted in the bottom of said case and disposed to be actuated whenever said case is laid down without withdrawing the stereograph to de-energize said bulb, whereby energy from said power source is conserved whenever said stereograph is withdrawn from said recess or said viewer is laid down when not in use.

References Cited in the file of this patent

UNITED STATES PATENTS

| Number | Name | Date |
|---|---|---|
| 1,221,091 | Richard | Apr. 3, 1917 |
| 1,504,989 | Spitzer | Aug. 12, 1924 |
| 1,511,791 | Weinberg | Oct. 14, 1924 |
| 1,516,128 | Wachtel | Nov. 18, 1924 |
| 1,520,311 | Ruth | Dec. 23, 1924 |
| 1,850,153 | Paroselli | Mar. 22, 1932 |
| 1,930,421 | Ehmer | Oct. 10, 1933 |
| 1,989,803 | Hoben | Feb. 5, 1935 |
| 2,002,602 | Graubner | May 28, 1935 |
| 2,118,900 | Schade | May 31, 1938 |
| 2,349,013 | Sparling | May 16, 1944 |
| 2,386,255 | Morey | Oct. 9, 1945 |
| 2,484,591 | Rochwite | Oct. 11, 1949 |